United States Patent
Andou et al.

(10) Patent No.: US 11,633,996 B2
(45) Date of Patent: Apr. 25, 2023

(54) SUSPENSION DEVICE FOR VEHICLE

(71) Applicant: MAZDA MOTOR CORPORATION, Hiroshima (JP)

(72) Inventors: Fumitaka Andou, Aki-gun (JP); Norio Asano, Aki-gun (JP); Masaya Hiramatsu, Aki-gun (JP); Koji Takahashi, Aki-gun (JP)

(73) Assignee: MAZDA MOTOR CORPORATION, Hiroshima (JP)

( * ) Notice: Subject to any disclaimer, the term of this patent is extended or adjusted under 35 U.S.C. 154(b) by 193 days.

(21) Appl. No.: 17/179,360

(22) Filed: Feb. 18, 2021

(65) Prior Publication Data

US 2021/0300137 A1     Sep. 30, 2021

(30) Foreign Application Priority Data

Mar. 27, 2020  (JP) .............................. JP2020-057590

(51) Int. Cl.
*B60G 3/22*   (2006.01)
*B60G 7/04*   (2006.01)

(52) U.S. Cl.
CPC ............... *B60G 3/225* (2013.01); *B60G 7/04* (2013.01); *B60G 2200/156* (2013.01); *B60G 2204/4502* (2013.01); *B60G 2206/124* (2013.01)

(58) Field of Classification Search
CPC . B60G 3/20; B60G 3/225; B60G 7/04; B60G 2200/156; B60G 2204/4502; B60G 2206/124; B60G 2200/144; B60G 2200/44; B60G 7/001; B60G 2204/45

USPC .................................................. 280/124.128
See application file for complete search history.

(56) References Cited

U.S. PATENT DOCUMENTS

| | | | | | |
|---|---|---|---|---|---|
| 5,284,353 | A | * | 2/1994 | Shinji | B62D 17/00 280/124.141 |
| 5,346,241 | A | * | 9/1994 | Lee | B60G 3/265 280/124.135 |
| 6,305,700 | B1 | * | 10/2001 | Bruehl | B60G 3/26 280/124.135 |
| 7,694,983 | B2 | * | 4/2010 | Griffiths | B60G 3/20 280/124.135 |
| 10,093,356 | B2 | * | 10/2018 | Lorenz | B60G 15/12 |
| 10,427,748 | B2 | * | 10/2019 | Ishii | B60G 3/207 |
| 11,192,414 | B1 | * | 12/2021 | Berardi | B60G 7/003 |
| 2019/0070919 | A1 | * | 3/2019 | Andou | B60G 7/008 |

FOREIGN PATENT DOCUMENTS

EP          2620301 B1 * 11/2014 ............... B60G 3/18
JP       H07-246815 A     9/1995

\* cited by examiner

*Primary Examiner* — Paul N Dickson
*Assistant Examiner* — Caitlin Anne Miller
(74) *Attorney, Agent, or Firm* — Studebaker & Brackett PC

(57) ABSTRACT

A double-wishbone type of suspension device for a vehicle comprises a forked-shaped upper arm, a forked-shaped lower arm, and a connecting rod which connects a front-side arm portion of the upper arm and a rear-side arm portion of the lower arm, wherein the connecting rod comprises an upper rod which is rotatably connected to the upper arm, a lower rod which is rotatably connected to said lower arm, and a resilient bush which connects the upper rod and the lower rod in an expandable manner in an axial direction.

11 Claims, 11 Drawing Sheets

SUSPENSION DEVICE FOR VEHICLE

BACKGROUND OF THE INVENTION

The present invention relates to a suspension device for a vehicle which is applicable to a vehicle, such as an automobile, and, in particular, to a double-wishbone type of suspension device.

A conventional double-wishbone type of suspension device comprises a knuckle which supports a wheel and a pair of upper-and-lower arms (an upper arm and a lower arm) which support an upper portion and a lower portion of the knuckle. In this kind of suspension device, there is a demerit that the upper arm moves forwardly and the lower arm moves rearwardly during vehicle braking, whereby the both arms move in an opposite direction, so that the caster rigidity of the wheel is not secured properly.

Further, in this kind of suspension device, resilient bushes are provided between respective vehicle-body connection portions of the upper arm and the lower arm and a vehicle body. These resilient bushes are set to be hard so that the above-described moves of the upper and lower arms during vehicle braking can be suppressed, so that the caster rigidity of the wheel can be secured properly. However, such hard setting of the resilient bushes hinders smooth longitudinal moves, in the same longitudinal direction, of the upper arm and the lower arm, so that the longitudinal compliance of the suspension is deteriorated.

Japanese Patent Laid-Open Publication No. H07-246815 discloses a suspension device for a vehicle as a technology to solve the above-described demerit (i.e., a technology to compatibly attain the caster-rigidity securement and the longitudinal-compliance securement). The suspension device for the vehicle disclosed in the above-described patent document comprises a knuckle which supports a wheel, an upper arm which is rotatably connected to a vehicle body vertically and pivotally supports an upper portion of the knuckle, a lower arm which is provided below the upper arm and rotatably connected to the vehicle body vertically, and pivotally supports a lower portion of the knuckle, and a connecting rod which is provided to extend between the upper arm and the lower arm. The connecting rod is arranged in an inclined state in a vehicle longitudinal direction and rotatably connected to the upper arm and the lower arm, respectively.

According to this device, since the connecting rod is provided between the upper arm and the lower arm and arranged in the inclined state in the vehicle longitudinal direction, the above-described longitudinal moves, in the opposite direction, of the upper arm and the lower arm during braking can be restricted by the connecting rod. Consequently, the caster rigidity can be secured properly. Further, since it is unnecessary that the resilient bushes provided between the respective vehicle-body connection portions of the upper and lower arms and the vehicle body are set to be hard, the longitudinal compliance of the suspension by means of the resilient bushes can be secured properly.

However, according to the suspension device for the vehicle disclosed in the above-described patent document, while the longitudinal moves, in the same longitudinal direction, of the both arms can be allowed and also the opposite moves, in the different directions, of the both arms during braking can be suppressed, there is a concern that a riding-over shock which is generated when the vehicle rides over a large step (level difference) may not be sufficiently absorbed by a resilient bush of the connecting rod, so that there may occur the large shock improperly.

SUMMARY OF THE INVENTION

Accordingly, an object of the present invention is to provide a suspension device for a vehicle which can compatibly attain the longitudinal-compliance securement and the caster-rigidity securement and also properly reduce the step-riding-over shock, without deteriorating the performance of the suspension.

The present invention is a double-wishbone type of suspension device for a vehicle, comprising a forked-shaped upper arm comprising a front-side arm portion and a rear-side arm portion, a forked-shaped lower arm comprising a front-side arm portion and a rear-side arm portion, and a rod member connecting the front-side arm portion of one of the upper arm and the lower arm and the rear-side arm portion of the other of the upper arm and the lower arm, wherein the rod member comprises an upper rod which is rotatably connected to the upper arm, a lower rod which is rotatably connected to the lower arm, and a bush which connects the upper rod and the lower rod in an expandable manner in an axial direction.

According to the present invention, since the rod member which is configured as described above is provided, the longitudinal-compliance securement and the caster-rigidity securement can be compatibly attained and the step-riding-over shock can be properly reduced, without deteriorating the performance of the suspension.

More specifically, since the rod member is provided to extend between the upper arm and the lower arm and arranged in the inclined state in the vehicle longitudinal direction, the longitudinal moves, in the opposite direction, of the upper arm and the lower arm during braking can be suppressed, so that the caster rigidity can be secured properly.

Further, while the resilient bushes are generally provided between the respective vehicle-body connection portions of the upper arm and the lower arm and the vehicle body, the longitudinal compliance of the suspension by means of the resilient bushes can be secured properly.

Moreover, since the rod member comprises the upper rod which is rotatably connected to the upper arm, the lower rod which is rotatably connected to the lower arm, and the bush which connects the upper rod and the lower rod in the expandable manner in the axial direction, the rod member can connect the upper arm and the lower arm without deteriorating respective vertical moves (swings) of the upper arm and the lower arm as the suspension performanc.

Additionally, since the bush connects the upper rod rotatably connected to the upper arm and the lower rod rotatably connected to the lower arm in the expandable manner in the axial direction, this bush absorbs the step-riding-over shock through its expansion/contraction in the axial direction, so that the step-riding-over shock can be reduced properly. Herein, the forked-shaped upper or lower arm comprising the front-side arm portion and the rear-side arm portion is an A, V, or L-shaped arm.

In an embodiment of the present invention, a stopper to restrict one side, in the axial direction, of the bush may be integrally formed at one of the upper rod and the lower rod. According to this embodiment, the number of parts or assembling steps can be reduced comparted to a case where this stopper is formed separately from this rod.

In another embodiment of the present invention, an other-side stopper to restrict the other side, in the axial direction, of the bush may be configured to be mountable on the above-described one of the upper rod and the lower rod. According to this embodiment, the other side, in the axial direction, of the bush can be restricted by mounting the other-side stopper on the above-described one of the upper rod and the lower rod. Moreover, the both sides, in the axial direction, of the bush is so restricted that the step-riding-over shock can be absorbed securely by this bush.

Herein, the above-described mounting of the other-side stopper on the one of the upper rod and the lower rod may be attained by screwing the other-side stopper to the one of the upper rod and the lower rod.

In another embodiment of the present invention, a washer may be provided between an end portion, in the axial direction, of the bush and the stopper. While the above-described washer is provided between the end portion, in the axial direction, of the bush and the stopper, this washer may be provided between the one-side end portion of the bush and the stopper or the both-side end portions of the bush and the stopper. Further, in a case where the washers are provided between the both-side end portions of the bush and the stopper, the number of washer(s) which is provided between the one-side end portion of the bush and the stopper may be the same as or different from the number of washer(s) which is provided between the other-side end portion of the bush and the stopper.

According to this embodiment, the characteristics, in the axial direction, of the bush which absorbs the step-riding-over shock can be adjusted. Specifically, the restriction state of the bush, the both side, in the axial direction, of which are restricted by the stopper, can be changed by providing the washer between the end portion, in the axial direction, of the bush and the stopper. Thus, the shock absorption performance of the bush, i.e., the axial-direction characteristics of the bush, can be changed by changing the restriction state of the bush. That is, the axial-direction characteristics of the bush can be controlled by adjusting existence/nonexistence or the number of washer(s) which is provided between the end portion of the bush and the stopper.

In another embodiment of the present invention, an outer cylinder may be fit into the bush in a state where the outer cylinder is restricted in the axial direction, and the other of the upper rod and the lower rod may be mounted on the outer cylinder. According to this embodiment, the other of the upper rod and the lower rod can be, in the expandable manner, connected to the bush which is restricted, in the axial direction, by the stopper of the one of the upper rod and the lower rod. Accordingly, the axial direction can be restricted by the stopper of the one of the upper rod and the lower rod, and also a relative move, in the axial direction, of the both rods which may occur in a step-riding-over traveling can be absorbed by the expandable bush where the other of the upper rod and the lower rod is connected in the expandable manner. Thereby, the step-riding-over shock can be reduced properly.

Herein, it is preferable that the upper arm and the lower arm be configured specifically as follows.

That is, the upper arm comprises a pair of front-and-rear vehicle-body connection portions which are connected to an upper portion of a side face of a vehicle-body front portion and a connecting-rod connection portion where an upper end portion of a connecting rod as the rod member is connected, the vehicle-body connection portions are respectively formed in a cylindrical shape, respective cylinder axial lines of which are provided coaxially to extend in a vehicle longitudinal direction, a cylindrical-shaped resilient bush is fit into each cylinder of the vehicle-body connection portions, a pair of front-and-rear support brackets which rotatably support the respective vehicle-body connection portions vertically are provided at the upper portion of the side face of the vehicle-body front portion, the support brackets support both end parts of respective rotational axis portions of the vehicle-body connection portions which extend in the vehicle longitudinal direction, and the respective rotational axis portions are rotatably inserted into respective central holes of the resilient bushes inside the vehicle-body connection portions.

Meanwhile, the lower arm comprises a pair of front-and-rear vehicle-body connection portions which are connected to a lower portion of a side face of a vehicle-body front portion and a connecting-rod connection portion where a lower end portion of a connecting rod as the rod member is connected, the vehicle-body connection portions are respectively formed in a cylindrical shape, respective cylinder axial lines of which are provided coaxially to extend in a vehicle longitudinal direction, a cylindrical-shaped resilient bush is fit into each cylinder of the vehicle-body connection portions, a pair of front-and-rear support brackets which rotatably support the respective vehicle-body connection portions vertically are provided at the lower portion of the side face of the vehicle-body front portion, the support brackets support both end parts of respective rotational axis portions of the vehicle-body connection portions which extend in the vehicle longitudinal direction, and the respective rotational axis portions are rotatably inserted into respective central holes of the resilient bushes inside the vehicle-body connection portions.

The present invention will become apparent from the following description which refers to the accompanying drawings.

DETAILED DESCRIPTION OF THE INVENTION

Embodiment

Figure 1:
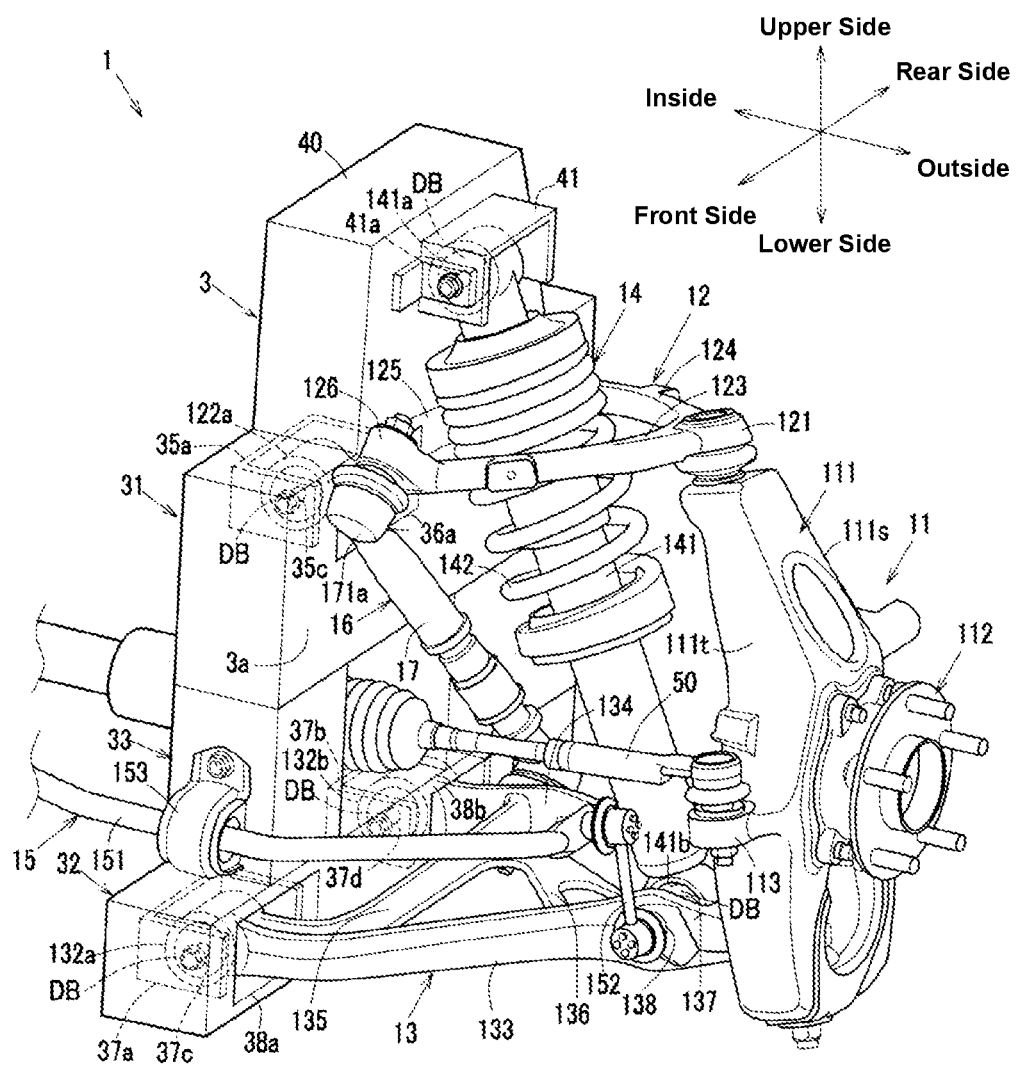
FIG. 1 is a perspective view showing a suspension device for a vehicle.

An embodiment of the present invention will be described referring to the drawings. A suspension device for a vehicle 1 according to the present embodiment will be described referring to FIGS. 1-7A, 7B. This suspension device for the vehicle 1 is a double-wishbone type of suspension device which is applicable to the vehicle, such as an automobile. Hereafter, an example in which the suspension device for the vehicle 1 is applied to a front suspension will be described specifically.

Herein, indications of "front side," "rear side," "inside," "outside," "upper side," and "lower side" shown in FIG. 1 and others mean a vehicle forward side, a vehicle rearward side, an inward side in a vehicle width direction, an outward side, in the vehicle width direction, a vehicle upward side, and a vehicle downward side, respectively.

Figure 2:
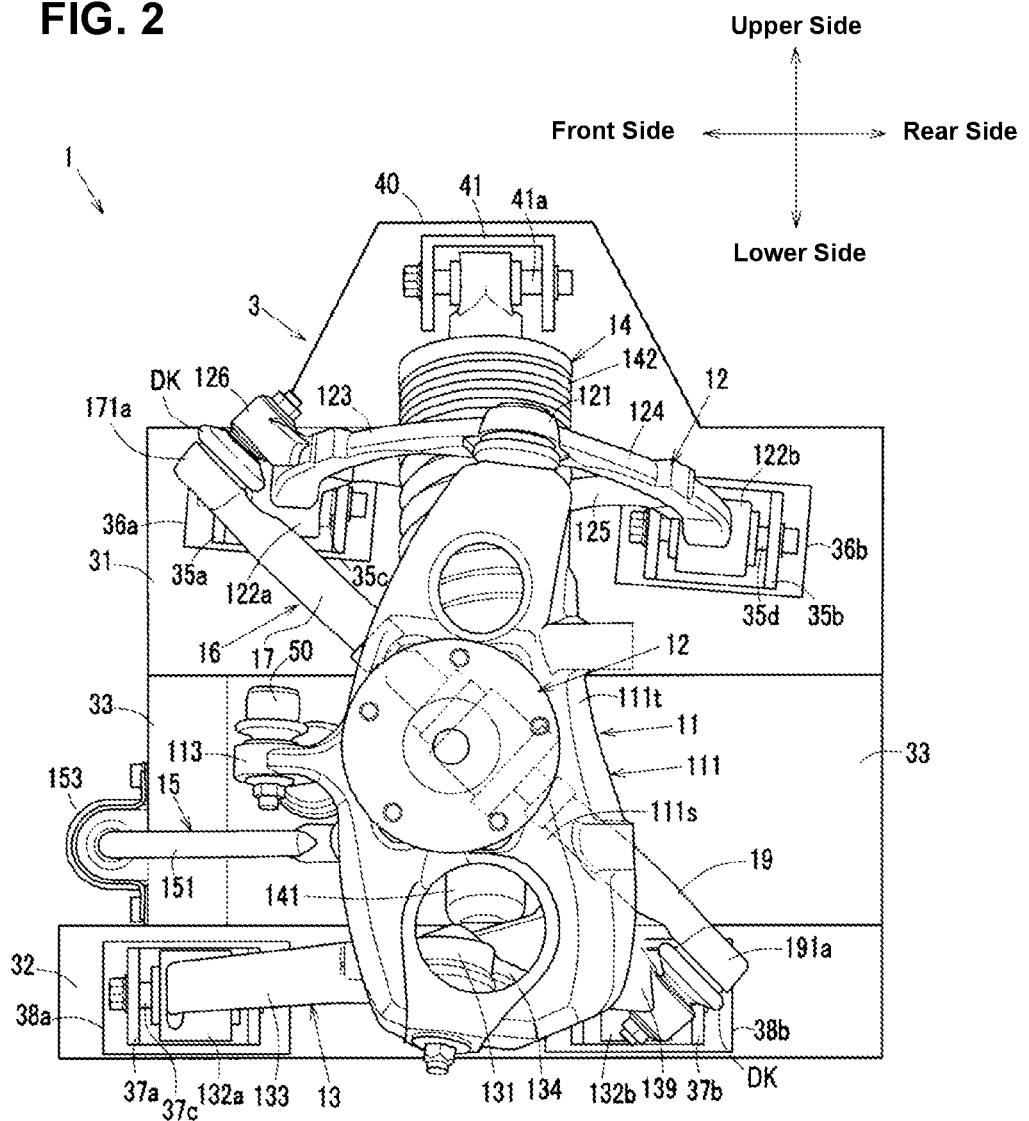
FIG. 2 is a side view of the suspension device for the vehicle, when viewed from a wheel side.

As shown in FIGS. 1 and 2, the suspension device for the vehicle 1 is configured such that a connecting rod 16 is connected to an upper arm 12 and a lower arm 13 which respectively support an upper portion and a lower portion of a knuckle 11 rotatably supporting a wheel in an inclined state in a vehicle longitudinal direction.

<Vehicle-Body Front Portion>

As shown in FIGS. 1 and 2, the suspension device for the vehicle 1 is attached to a side face 3a of each of right-and-left both sides of a vehicle-body front portion 3 (i.e., an outward side, in the vehicle width direction, of the vehicle). Herein, in FIG. 1, a left side of the vehicle-body front portion 3 is illustrated only. The vehicle-body front portion 3 comprises a pair of right-and-left front side frames 31, a pair of right-and-left side members 32, and connecting members 33 which interconnect the front side frame 31 and the side member 32.

The front side frame 31 is a bar-shaped member extending in the vehicle longitudinal direction and provided at each of the right-and-left both sides of the vehicle-body front portion 3. The side member 32 is a bar-shaped member extending in the vehicle longitudinal direction and provided at each of the right-and-left both sides of the vehicle-body front portion 3 such that it is downwardly separated from the front side frame 31. The connecting members 33 are respectively provided at a front side and a rear side of an upper face of the side member 32. The side member 32 and the front side frame 31 are interconnected by the connecting members 33. A suspension tower 40 which supports an upper end portion of a damper 14, which will be described later, is provided on an upper face of the front side frame 31. The side face 3a of the outward side, in the vehicle width direction, of the vehicle-body front portion 3 is formed by the front side fame 31, the side member 32, the connecting members 33, and the suspension tower 40.

<Suspension Device for Vehicle>

Figure 3:
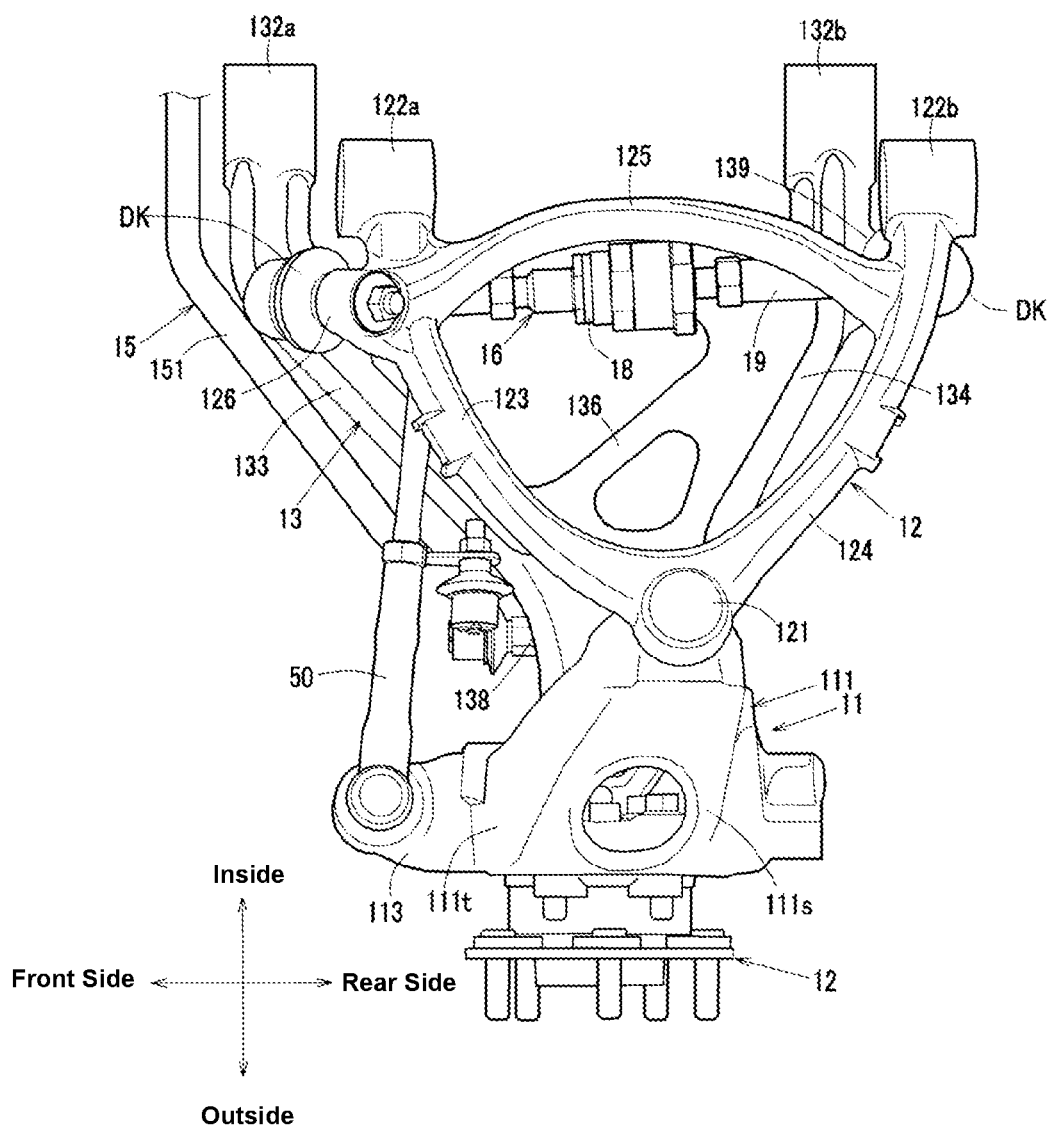
FIG. 3 is a plan view showing the suspension device for the vehicle (illustration of a damper is omitted).

As shown in FIGS. 1-3, the suspension device for the vehicle 1 comprises the knuckle 11 which rotatably supports a front wheel, the upper arm 12 which supports the upper portion of the knuckle 11, the lower arm 13 which supports the lower portion of the knuckle 11, the damper 14 which absorbs a shock transmitted from a ground surface, a stabilizer 15 which suppresses fluctuation (difference) of respective vertical moves of the right-and-left suspension devices 1, and the connecting rod 16 which suppresses longitudinal moves, in an opposite direction, of the upper arm 12 and the lower arm 13 during braking.

<Upper Arm>

Figure 4:
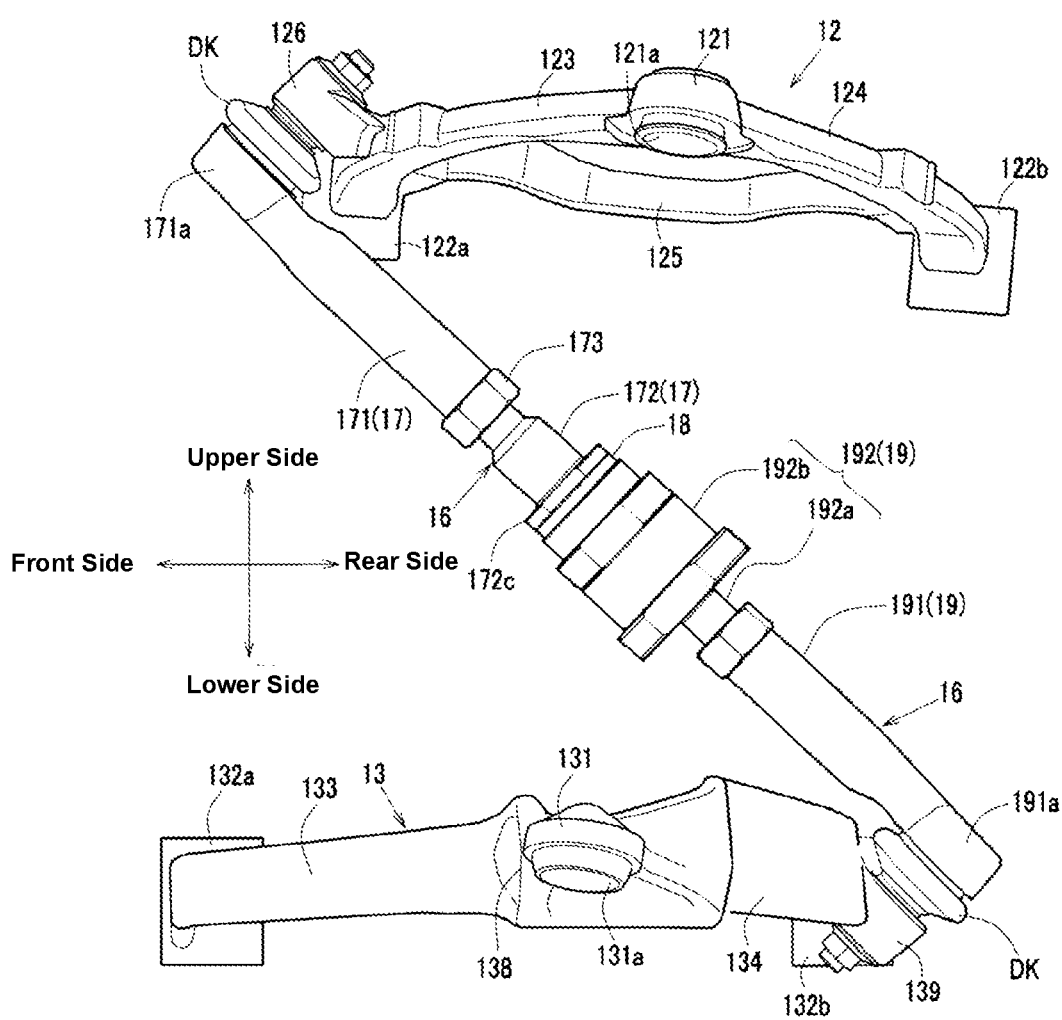
FIG. 4 is a side view of an upper arm, a lower arm, and a connecting rod, when viewed from the wheel side.
Figure 5:
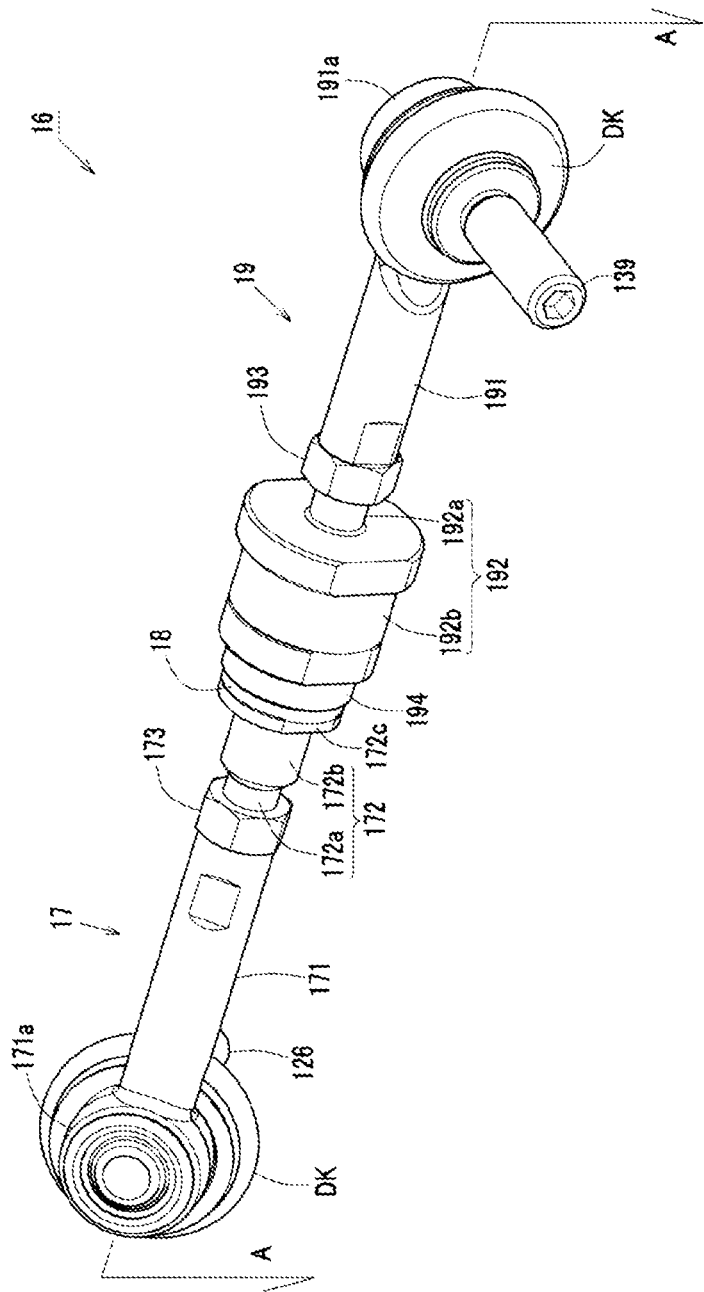
FIG. 5 is a perspective view of the connecting rod.
Figure 6:
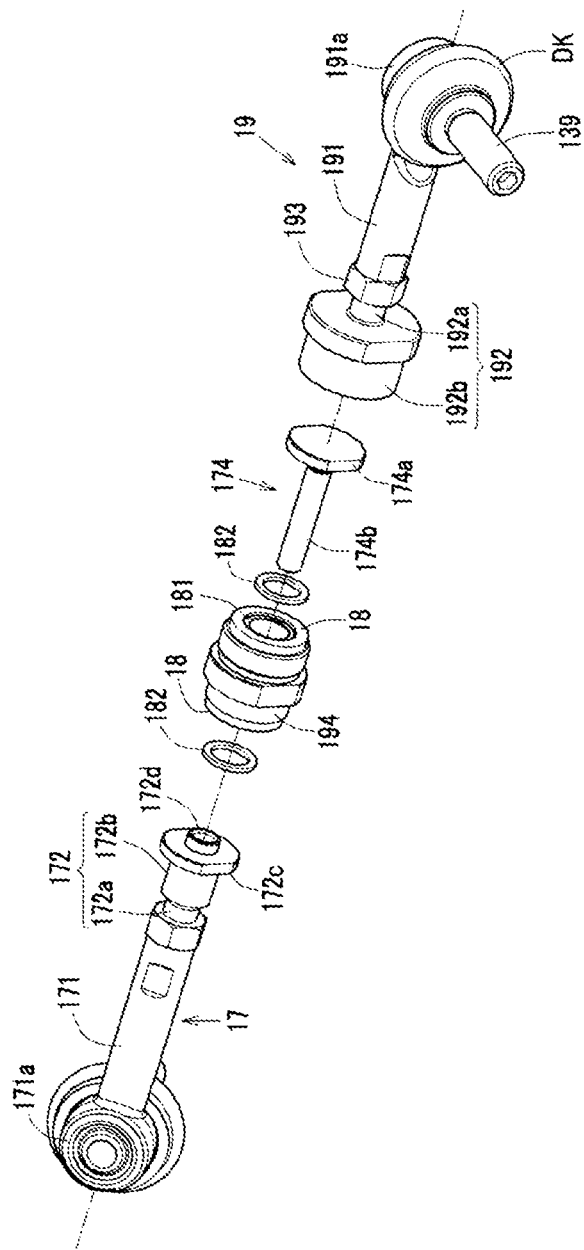
FIG. 6 is an exploded perspective view of the connecting rod.

As shown in FIGS. 3 and 4, the upper arm 12 is formed in the nearly A shape in a plan view, for example. The upper arm 12 comprises a knuckle connection portion 121 which is connected to the upper portion of the knuckle 11, a pair of front-and-rear vehicle-body connection portions (a front-side vehicle-body connection portion 122a and a rear-side vehicle-body connection portion 122b) which are connected to an upper portion of the side face 3a of the vehicle-body front portion 3, a front-side arm portion 123 which connects the knuckle connection portion 121 and the front-side vehicle-body connection portion 122a, a rear-side arm portion 124 which connects the knuckle connection portion 121 and the rear-side vehicle-body connection portion 122b, a connection arm portion 125 which is provided to extend between the front-side arm portion 123 and the rear-side arm portion 124, and a connecting-rod connection portion 126 where a front end portion of the connecting rod 16 is connected.

A recess portion 121a where a ball joint, described later, which is provided at the upper portion of the knuckle 11 is pivotally connected is provided at a lower face of the knuckle connection portion 121. The respective vehicle-body connection portions 122a, 122b are separated from each other in the longitudinal direction and connected rotatably in a vertical direction at the upper portion of the side face 3a of each of the right-and-left both sides of the vehicle-body front portion 3 (for example, an outward-side side face, in the vehicle width direction, of the front side frame 31) (see FIGS. 1 and 2). More specifically, the vehicle-body connection portions 122a, 122b are formed in a cylindrical shape, and their cylinder axial lines are provided coaxially to extend in the vehicle longitudinal direction. A cylindrical-shaped resilient bush DB is fit into each of the cylinders of the vehicle-body connection portions 122a, 122b (see FIG. 1).

Meanwhile, as shown in FIGS. 1 and 2, a pair of front-and-rear support brackets (a front-side support bracket 35a and a rear-side support bracket 35b) which rotatably support the respective vehicle-body connection portions 122a, 122b vertically are provided at the upper portion of the side face 3a of each of the right-and-left sides of the vehicle-body front portion 3 (for example, the outward-side side face, in the vehicle width direction, of the front side frame 31).

The support brackets 35a, 35b support respective both end parts of rotational axis portions 35c, 35d which extend in the vehicle longitudinal direction. The respective rotational axis portions 35c, 35d are rotatably inserted into respective central holes of the resilient bushes DB inside the vehicle-body connection portions 122a, 122b of the upper arm 12. Each of the support brackets 35a, 35b is formed in a nearly U shape in the plan view such that its front end portion and rear end portion are bent outwardly in the vehicle width direction. Further, its front end portion and rear end portion are connected to a front end part and a rear end part of each of the rotational axis portions 35c, 35d, whereby the support brackets 35a, 35b support the respective both end parts (i.e., the above-described front-and-rear end parts) of the rotational axis portions 35c, 35d.

The rotational axis portions 35c, 35d are arranged coaxially and inclined such that they extend obliquely forwardly-and-upwardly, for example. Thereby, the upper arm 12 is connected to the upper portion of the side face 3a of the vehicle-body front portion 3 in the inclined state where its front side is located at a higher level than its rear side.

More specifically, a pair of front-and-rear storage recess portions (a fronts-ide storage recess portion 36a and a rear-side storage recess portion 36b) are provided at the upper portion of the side face 3a of the vehicle-body front portion 3, for example (see FIGS. 1 and 2). The support brackets 35a, 35b are provided inside the storage recess portions 36a, 36b, respectively.

The front-side arm portion 123 extends obliquely outwardly-and-rearwardly and is formed in a bar shape which is curved forwardly in a convex shape, for example. An outside end part, in a longitudinal direction, of the front-side arm portion 123 is connected to the knuckle connection portion 121, and an inside end part, in the longitudinal direction, of the front-side arm portion 123 is connected to the front-side vehicle-body connection portion 122a.

The rear-side arm portion 124 extends obliquely outwardly-and-forwardly and is formed in a bar shape which is curved rearwardly in a convex shape, for example. An outside end part, in a longitudinal direction, of the rear-side arm portion 124 is connected to the knuckle connection portion 121, and an inside end part, in the longitudinal direction, of the rear-side arm portion 124 is connected to the rear-side vehicle-body connection portion 122b.

The connection arm portion 125 extends in the vehicle longitudinal direction and is formed in a bar shape which is curved inwardly, in the vehicle width direction, in a convex shape, for example. A front end part, in a longitudinal direction, of the connection arm portion 125 is connected to near an inside end part, in the longitudinal direction, of the front-side arm portion 123, and a rear end part, in the longitudinal direction, of the connection arm portion 125 is connected to near an inside end part, in the longitudinal direction, of the rear-side arm portion 124.

The connecting-rod connection portion 126 is provided in front of a front side portion of the upper arm 12 (i.e., in front of the front-side arm portion 123). More specifically, the connecting-rod connection portion 126 is provided neat the inside end portion, in the longitudinal direction, of the front-side arm portion 123. In other words, the connecting-rod connection portion 126 is provided in front of a connection part of the front-side arm portion 123 and the connection arm portion 125.

Figure 7A:
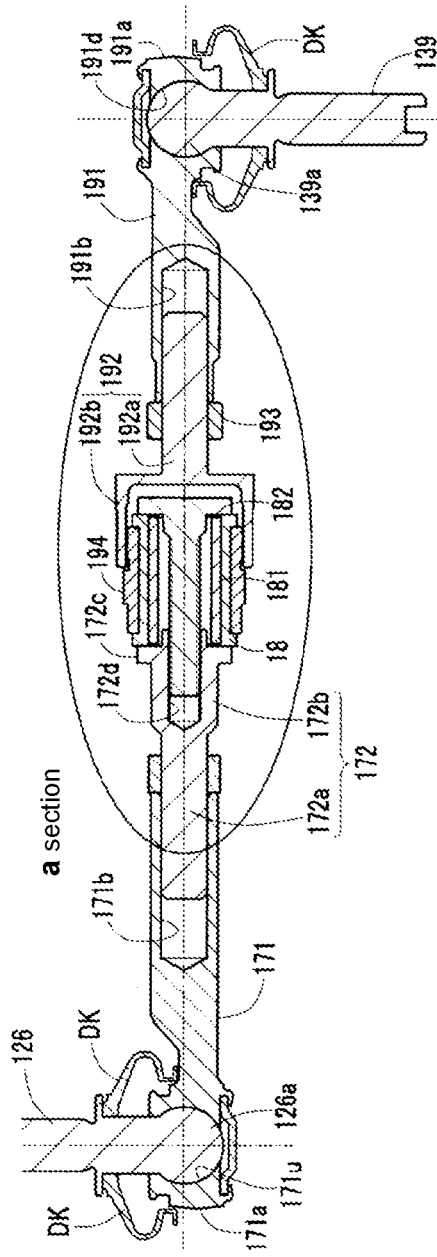
FIGS. 7A and 7B are sectional views taken along line A-A of FIG. 5.
Figure 7B:
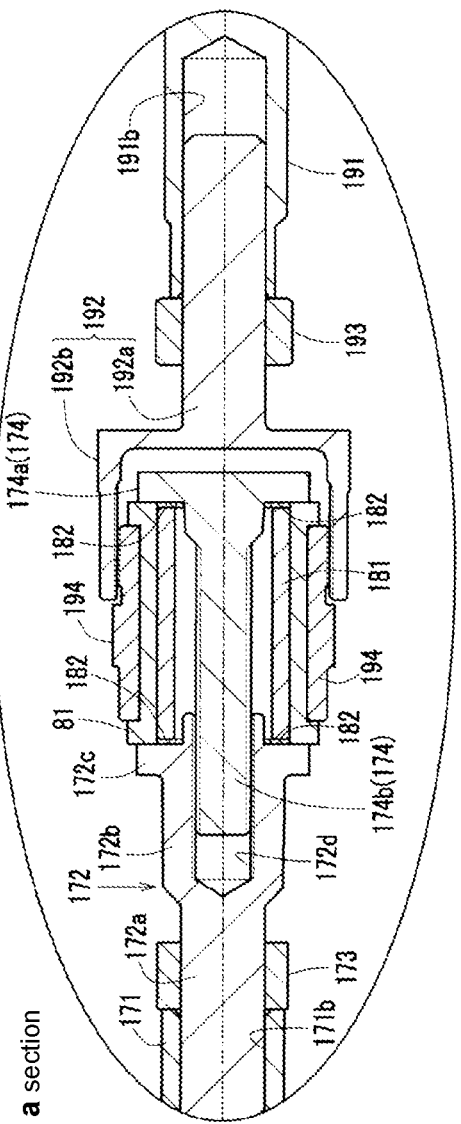

Further, the connecting-rod connection portion 126 protrudes obliquely forwardly-and-upwardly, and a ball joint 126a where a front end portion of the connecting rod 16 is connected is provided at a lower face of the connecting-rod connection portion 126 (see FIGS. 7A, 7B). Accordingly, the connecting-rod connection portion 126 is arranged substantially in parallel to the connecting rod 16 which is formed in a linear bar shape as described later. Consequently, when the front end portion of the connecting rod 16 is connected to the connecting-rod connection portion 126, a situation where a connection angle of the connecting rod 16 relative to the connecting-rod connection portion 126 becomes an inappropriate angle can be avoided. That is, the front end portion of the connecting rod 16 is connected to the connecting-rod connection portion 126 so that the connecting rod 16 can be rotated not only in the vehicle width direction but in the vehicle longitudinal direction.

The upper arm 12 described above is connected to the side face 3a of the vehicle-body front portion 3 vertically movably by rotatably supporting the vehicle-body connection portions 122a, 122b at the support brackets 35a, 35b.

<Lower Arm>

As shown in FIGS. 3 and 4, the lower arm 13 is formed in the nearly A shape in the plan view, for example. The lower arm 13 comprises a knuckle connection portion 131 which is connected to the lower portion of the knuckle 11, a pair of front-and-rear vehicle-body connection portions (a front-side vehicle-body connection portion 132a and a rear-side vehicle-body connection portion 132b) which are connected to a lower portion of the side face 3a of the vehicle-body front portion 3, a front-side arm portion 133 which connects the knuckle connection portion 131 and the front-side vehicle-body connection portion 132a, a rear-side arm portion 134 which connects the knuckle connection portion 131 and the rear-side vehicle-body connection portion 132b, a connection arm portion 135 and an inclined connection portion 136 which are provided to extend between the front-side arm portion 133 and the rear-side arm portion 134, a damper connection portion 137 where a lower end portion of the damper 14 is connected, a stabilizer connection portion 138 where an end portion of the stabilizer 15 is connected, and a connecting-rod connection portion 139 where a lower end portion of the connecting rod 16 is connected.

A recess portion 131a where a ball joint, described later, which is provided at the lower portion of the knuckle 11 is pivotally connected is provided at a lower face of the knuckle connection portion 131. The respective vehicle-body connection portions 132a, 132b are separated from each other in the longitudinal direction and connected rotatably in the vertical direction at the lower portion of the side face 3a of each of the right-and-left both sides of the vehicle-body front portion 3 (see FIGS. 1 and 2). More specifically, the vehicle-body connection portions 132a, 132b are formed in a cylindrical shape, and their cylinder axial lines are provided coaxially to extend in the vehicle longitudinal direction. A cylindrical-shaped resilient bush DB is fit into each of the cylinders of the vehicle-body connection portions 132a, 132b (see FIG. 1).

Meanwhile, as shown in FIGS. 1 and 2, a pair of front-and-rear support brackets (a front-side support bracket 37a and a rear-side support bracket 37b) which rotatably support the respective vehicle-body connection portions 132a, 132b vertically are provided at the lower portion of the side face 3a of each of the right-and-left sides of the vehicle-body front portion 3 (for example, an outward-side side face, in the vehicle width direction, of the side member 32).

The support brackets 37a, 37b support respective rotational axis portions 37c, 37d which extend in the vehicle longitudinal direction. The respective rotational axis portions 37c, 37d are rotatably inserted into respective central holes of the resilient bushes DB inside the vehicle-body connection portions 132a, 132b of the lower arm 13. Each of the support brackets 37a, 37b is formed in a nearly U shape in the plan view such that its front end portion and rear end portion are bent outwardly in the vehicle width direction. Further, its front end portion and rear end portion are connected to a front end part and a rear end part of each of the rotational axis portions 37c, 37d, whereby the support brackets 35a, 35b support the respective both end parts (i.e., the above-described front-and-rear end parts) of the rotational axis portions 37c, 37d.

The rotational axis portions 37c, 37d are arranged coaxially and also arranged in parallel to the vehicle longitudinal direction, for example. Thereby, the lower arm 13 is connected to the lower portion of the side face 3a of the vehicle-body front portion 3 in the parallel state to the vehicle longitudinal direction.

More specifically, a pair of front-and-rear storage recess portions (a fronts-ide storage recess portion 38a and a rear-side storage recess portion 38b) are provided at the lower portion of the side face 3a of the vehicle-body front portion 3, for example (see FIGS. 1 and 2). The support brackets 37a, 37b are provided inside the storage recess portions 38a, 38b, respectively.

The front-side arm portion 133 is formed in a bar shape which extends obliquely outwardly-and-rearwardly. More specifically, the front-side arm portion 133 is configured to extend outwardly from the front-side vehicle-body connection portion 132a substantially in parallel to the vehicle width direction, then be bent and extend obliquely rearwardly, and then be bent again and extend outwardly substantially in parallel to the vehicle width direction. An outside end part, in a longitudinal direction, of the front-side arm portion 133 is connected to the knuckle connection portion 131, and an inside end part, in the longitudinal direction, of the front-side arm portion 133 is connected to the front-side vehicle-body connection portion 132a.

The rear-side arm portion 134 is formed in a bar shape which extends obliquely outwardly-and-forwardly. More specifically, the rear-side arm portion 134 is configured to extend outwardly from the rear-side vehicle-body connection portion 132b substantially in parallel to the vehicle width direction, then be bent and extend obliquely forwardly, and then be bent again and extend outwardly substantially in parallel to the vehicle width direction. An outside end part, in a longitudinal direction, of the rear-side arm portion 134 is connected to the knuckle connection portion 131, and an inside end part, in the longitudinal direction, of the rear-side arm portion 134 is connected to the rear-side vehicle-body connection portion 132b.

That is, a distance between the front-side arm portion 133 and the rear-side arm portion 134 (i.e., a width, in the longitudinal direction, of the lower arm 13) is relatively narrow on the side of the knuckle connection portion 131, is relatively wide on the side of the vehicle-body connection portions 132a, 132b, and becomes narrower toward the knuckle connection portion 131 at a middle position between the knuckle connection portion 131 and the vehicle-body connection portions 132a, 132b.

The connection arm portion 135 is formed in a bar shape which extends in the vehicle longitudinal direction. A front end part, in a longitudinal direction, of the connection arm portion 135 is connected to near an inside end part, in the longitudinal direction, of the front-side arm portion 133, and a rear end part, in the longitudinal direction, of the connection arm portion 135 is connected to near an inside end part, in the longitudinal direction, of the rear-side arm portion 134.

The inclined connection portion 136 is formed in a slender flat-plate shape which extends obliquely forwardly-and-outwardly. A front end part, in a longitudinal direction, of the inclined connection portion 136 is connected to a center, in the longitudinal direction, of the front-side arm portion 133, and a rear end part, in the longitudinal direction, of the inclined connection arm portion 136 is connected to near the inside end part, in the longitudinal direction, of the rear-side arm portion 134.

The damper connection portion 137 is provided at a narrow-width portion of the lower arm 13 which is located near the knuckle connection portion 131 (see FIG. 1). The damper connection portion 137 is provided with a rotational axis portion (not illustrated) to rotatably support the lower end portion of the damper 14. This rotational axis portion extends in the longitudinal direction, and its front end part and rear end part are respectively connected to a part of the front-side arm portion 133 which forms a front part of the above-described narrow-wide portion and a part of the rear-side arm portion 134 which forms a rear part of the above-described narrow-wide portion.

The stabilizer connection portion 138 is provided at a position of a front side of the front side portion of the lower arm 13 (i.e., at a position of a front side of the front-side arm portion 133) which is located near the knuckle connection portion 131. The connecting-rod connection portion 139 is provided at a rear side of the rear side portion of the lower arm 13 (i.e., at a rear side of the rear-side arm portion 134). That is, the connecting-rod connection portion 139 is provided at a position of the lower arm 13 which is located on an opposite side of the stabilizer connection portion 138.

Further, the connecting-rod connection portion 139 is provided near the inside end part, in the longitudinal direction, of the rear-side arm portion 134. That is, the connecting-rod connection portion 139 is provided in back of a connection part of the rear-side arm portion 134 and the connection arm portion 135.

Further, the connecting-rod connection portion 139 protrudes obliquely rearwardly-and-downwardly, and a ball joint 139a where a rear end portion of the connecting rod 16 is connected is provided on an upper face of the connecting-rod connection portion 139 (see FIGS. 7A, 7B). Accordingly, the connecting-rod connection portion 139 is arranged substantially in parallel to the connecting rod 16 which is formed in a linear bar shape, which will be described later. Consequently, when the rear end portion of the connecting rod 16 is connected to the connecting-rod connection portion 139, a situation where a connection angle of the connecting rod 16 relative to the connecting-rod connection portion 139 becomes an inappropriate angle can be avoided. That is, the rear end portion of the connecting rod 16 is connected to the connecting-rod connection portion 139 so that the connecting rod 16 can be rotated not only in the vehicle width direction but in the vehicle longitudinal direction.

The lower arm 13 described above is arranged below the upper arm 12 and connected to the side face 3a of the vehicle-body front portion 3 vertically movably by rotatably supporting the vehicle-body connection portions 132a, 132b at the support brackets 37a, 37b.

<Knuckle>

As shown in FIGS. 1-3, the knuckle 11 comprises a knuckle body 111, a hub 112 which rotatably supports the front wheel, and a steering-rod connection portion 113 where a steering rod 50 which is continuous from a steering mechanism, not illustrated, is connected. The steering rod 50 is a rod to rotate the knuckle 11 in a vehicle lateral direction.

The knuckle body 111 comprises a main plate portion 111s which is directed in the vehicle width direction and a peripheral wall portion 111t which raises from a peripheral edge of the main plate portion 111s toward the vehicle inward side, for example. The main plate portion 111s is configured such that its vertical length is longer and its upper part is inclined inwardly, in the vehicle width direction, for example.

A ball joint is provided at an upper portion of the knuckle body 111 (e.g., an upper face of an upper end part of the peripheral wall portion 111t), and this ball joint is pivotally connected to an inside of the recess portion 121a at the lower face of the knuckle connection portion 121 of the upper arm 12. A ball joint is provided at a lower portion of the knuckle body 111 (e.g., an upper face of a lower end part of the peripheral wall portion 111t), and this ball joint is pivotally connected to an inside of the recess portion 131a at the lower face of the knuckle connection portion 131 of the lower arm 13.

Thus, the respective ball joints provided at the upper portion and the lower portion of the knuckle 11 are pivotally connected to the recess portions 121a, 131a of the knuckle connection portions 121, 131 of the respective arms 12, 13, whereby the knuckle 11 is rotatably supported at the respective arms 12, 13 vertically and in the vehicle width direction relative to the vehicle body.

The hub 112 is rotatably connected to a portion of an outward side face, in the vehicle width direction, of the knuckle body 111 (i.e., an outward side face, in the vehicle width direction, of the main plate portion 111s) which is located at a center, in the vehicle direction, of the knuckle body 111 and also at a center, in the longitudinal direction, of the knuckle body 111, for example.

The steering-rod connection portion 113 is provided to protrude forwardly at a center, in the vertical direction, of a front end of the knuckle body 111, for example. That is, the steering-rod connection portion 113 is provided on an opposite side, in the longitudinal direction, of the connecting-rod connection portion 139 relative to the center, in the longitudinal direction, of the knuckle 11. A ball joint is provided at an upper face of the steering-rod connection portion 113, for example, and a tip portion of the steering rod 50 is pivotally connected to this ball joint.

<Damper>

As shown in FIG. 1, the damper 14 comprises a damper body 141 which is expandable in its longitudinal direction and a spring 142 which is disposed around an upper half of the damper body 141 and biases the damper body 141 in its expansion direction.

The damper 14 is provided to be inserted into an opening portion which is formed by the respective arm portions of the upper arm 12 (the front-side arm portion 123, the rear-side arm portion 124, and the connection arm portion 125). An upper end portion of the damper body 141 is connected to an upper end portion of the side face 3a of the vehicle-body front portion 3, and a lower end portion of the damper body 141 is connected to the damper connection portion 137 of the lower arm 13.

More specifically, penetration holes 141a, 141b which extend in the vehicle longitudinal direction are respectively provided at an upper end portion and a lower end portion of the damper body 141, and cylindrical resilient bushes DB are fit into these penetration holes 141a, 141b.

Meanwhile, the suspension tower 40 is provided to stand at the upper portion of each of the right-and-left both sides of the vehicle-body front portion 3 (i.e., at an upper portion of the front side frame 31). A support bracket 41 which supports the upper end portion of the damper body 141 is provided at an outward side face, in the vehicle width direction, of the suspension tower 40 (at the upper end portion of the side face 3a of the vehicle-body front portion 3).

The support bracket 41 supports both end parts of a rotational axis portion 41a which extends in the vehicle longitudinal direction. The rotational axis portion 41a is rotatably inserted into the resilient bush DB inside the penetration hole 141a which is provided at the upper end portion of the damper body 141. The support bracket 41 is formed in a nearly U shape in a side view such that its front end portion and rear end portion are bent downwardly, respectively. These front end portion and rear end portion are connected to a front end part and a rear end part of the rotational axis portion 41a, thereby supporting the both end parts of the rotational axis portion 41a (i.e., the above-described front end part and rear end part). Thus, the upper end portion of the damper body 141 is supported by the supporting bracket 41, whereby the upper end portion of the damper body 141 is connected rotatably in the vehicle width direction at the upper end portion of the side face 3a of the vehicle-body front portion 3.

Meanwhile, the lower end portion of the damper body 141 is configured such that its rotational axis portion extending in the longitudinal direction (not illustrated) is inserted into the resilient bush DB inside the penetration hole 141b. Both end parts, in the longitudinal direction, of the above-described rotational axis portion are supported at the damper connection portion 137 of the lower arm 13, whereby the lower end portion of the damper body 141 is connected to the damper connection portion 137 rotatably in the vehicle width direction.

<Stabilizer>

As shown in FIG. 1, the stabilizer 15 comprises a stabilizer body 151 and a pair of bar-shaped link portions 152 which connect both ends of the stabilizer body 151 to the stabilizer connection portions 138 of the right-and-left both lower arms 13. In FIG. 1, the left-side link portion 152 is illustrated only.

The stabilizer body 151 is formed in a bar shape which extends in the vehicle width direction, and each of both end portions, in a longitudinal direction, of the stabilizer body 151 is inclined obliquely outwardly-and-rearwardly. Both-side portions of a center, in the longitudinal direction, of the stabilizer body 151 are rotatably attached to a vehicle-body front portion by attaching members 153. In FIG. 1, the left-side link portion 152 and the left-side attaching member 153 are illustrated only.

In this attachment state, each of the both end portions, in the longitudinal direction, of the stabilizer body 151 is arranged in front of and above the lower arm 13 and rotatable in the vertical direction. Further, in this attachment state, each of the both end portions, in the longitudinal direction, of the stabilizer body 151 is connected to the stabilizer connection portion 138 of the lower arm 13 via the link portion 152.

<Connecting Rod>

As shown in FIGS. 4-7A, 7B, the connecting rod 16 comprises an upper rod 17, a resilient bush 18, and a lower rod 19, which is formed in a linear bar shape.

The upper rod 17 comprises a columnar-shaped body portion 171, an adjusting rod 172 which is connected to the body portion such that its length is changeable, a fixation nut 173 which fixes the body portion 171 to the adjusting rod 172, and a tip stopper 174 which is mounded on the adjusting rod 172.

A joint part 171a is provided at the body portion 171, and a screw adjustment part 171b which is screwed to an axial adjustment portion 172a, described later, of the adjusting rod 172 is provided at a lower end of the body portion 171.

The joint part 171a has a recess section 171u which is provided at its inside as shown in FIG. 7A, and a ball joint 126a which is provided at the connecting-rod connection portion 126 of the upper arm 12 is pivotally connected to the recess section 171u. Herein, a resilient cover DK is provided between the ball joint 126a pivotally connected to the recess section 171u and the joint part 171a so as to cover the ball joint 126a. The screw adjustment part 171b is formed inside a lower end of the body portion 171 and has a recess shape where the axial adjustment portion 172a is inserted, and a screw groove is formed its inner surface.

The adjusting rod 172 comprises a columnar-shaped axial adjustment portion 172a and an outer cylindrical portion 172b which is provided at a lower end of the axial adjustment portion 172a. The axial adjustment portion 172a has a columnar shape which is inserted into the screw adjustment part 171b of the body portion 171 and has a screw projection to be screwed to the screw groove formed at the inner surface of the screw adjustment portion 171b.

As shown in an enlarged view of an a section of FIG. 7B, the outer cylindrical portion 172b is provided with a flange part 172c which expands outwardly, in a radial direction, of its lower end, and also has a screw recess section 172d where an axial portion 174b, described later, of the tip stopper 174 is inserted and screwed. The screw recess section 172d has a screw groove to be screwed to the screw projection formed at an outer surface of the axial portion 174b of the tip stopper 174 at its inner surface.

The fixation nut 173 serves as a double nut which is screwed to the screw adjustment portion 171b and the screw projection of the axial adjustment portion 172a with the properly adjusted length, thereby fixing a relative position of the body portion 171 to the adjusting rod 172.

The tip stopper 174 comprises a disc-shaped restriction disc portion 174a which faces, in an axial direction, the flange part 172c of the adjusting rod 172 in a state where the tip stopper 174 is attached to the adjusting rod 172 and an axial portion 174b which extends from a center of the restriction disc portion 174a toward the adjusting rod 172. Herein, a screw projection to be screwed to the screw groove formed at the inner surface of the screw recess section 172d is formed at an outer peripheral surface of the axial portion 174b.

The resilient bush 18 is of a rubber-made cylindrical shape and an inner cylinder 181 is pressed into the resilient bush 18 along an inner peripheral surface of the bush 18. Further, this resilient bush 18 is a cylindrical member which has a rather smaller diameter than an outer cylindrical portion 192b, described later, and a specified thickness, and has a fit-into recess section 18a which is configured such that a part of its outer peripheral surface is recessed inwardly in its radial direction except both end portions, in the axial direction, thereof.

The inner cylinder 181 is a cylindrical member which has a higher rigidity than the resilient bush 18 and has substantially the same length, in an axial direction, as the resilient bush 18. A space where the axial portion 174b of the tip stopper 174 of the upper rod 17 is inserted is formed inside the inner cylinder 181.

Washers 182 are arranged at both sides, in the axial direction, of the inner cylinder 181. The washer 182 is a ring-shaped member with a specified thickness, which has its outer diameter which is smaller than an outer diameter of the cylinder 181, i.e., an inner diameter of the resilient bush 18, and has its inner diameter which is larger than an outer diameter of the axis portion 174b of the tip stopper 174. In the present embodiment, the washer 182 having the 1.0 mm thickness is used.

The lower rod 19 comprises a columnar-shaped body portion 191, an outer-cylinder axial portion 192 which is connected to the body portion 191 such that its length is changeable, a fixation nut 193 which fixes the body portion 191 to the outer-cylinder axial portion 192, and an outer-fit-into cylindrical portion 194 which is fit into the resilient bush 18.

A joint part 191a is provided at a lower end of the body portion 191, and a screw adjustment part 191b which is screwed to an axial adjustment portion 192a, described later, of the outer-cylinder axial portion 192 is provided at an upper end of the body portion 191.

The joint part 191a has a recess section 191d which is provided at its inside as shown in FIG. 7A, and a ball joint 139a which is provided at the connecting-rod connection portion 139 of the lower arm 13 is pivotally connected to the recess section 191d. Herein, a rubber-made resilient cover DK is provided between the ball joint 139a pivotally connected to the recess section 191d and the joint part 191a so as to cover the ball joint 126a. The screw adjustment part 191b is formed inside an upper end of the body portion 191 and has a recess shape where the axial adjustment portion 192a is inserted, and a screw groove is formed its inner surface.

As shown in the enlarged view of the a section of FIG. 7B, the outer cylindrical portion 192 comprises the columnar-shaped the axial adjustment portion 192a and the outer cylindrical portion 192b which is provided at the upper end of the axial adjustment portion 192a. The axial adjustment portion 192a is a columnar-shaped member which is inserted into the above-described screw adjustment part 191b of the body portion 191, and has a screw projection to be screwed to the screw groove formed at the inner surface of the screw adjustment part 191b.

The outer cylindrical portion 192b is a nearly cylindrical-shaped member with a bottom, an upper side of which is opened, and a screw groove to be screwed to a screw projection, described later, which is formed at an outer surface of the outer-fit-into cylindrical portion 194 is formed at an inner surface of the outer cylindrical portion 192b. The fixation nut 193 serves as a double nut which is screwed to the screw adjustment portion 191b and the screw projection of the axial adjustment portion 192a with the properly adjusted length, thereby fixing a relative position of the body portion 191 to the outer cylindrical portion 192.

The outer-fit-into cylindrical portion 194 is a cylindrical member which is fit into the fit-into recess section 18a which is formed at an outer peripheral surface of the resilient bush 18, and a screw projection to be screwed to the screw groove formed at the inner surface of the outer cylindrical portion 192b.

Herein, reference character DK in FIGS. 7A and 7B, denotes the resilient covers which cover the ball joints 126a, 139a, respectively. The resilient cover DK are formed in a cylindrical shape, arranged between the end portions of the connecting rod 16 and the connecting-rod connection portions 126, 139, and mounted around the ball joints 126a, 139a, respectively.

Subsequently, assembling of the connecting rod 16 will be described. First, the inner cylinder 181 is pressed into the inner peripheral portion of the resilient bush 18 described above, and the washers 182 are provided at the end portions, in the axial direction, of the inner cylinder 181. Since the resilient bush 18 and the inner cylinder 181 have substantially the same length, a space having the thickness of the washer 182 is formed on the side of the end portion of the resilient bush 18 by arranging the washer 182.

The number of the arranged washers 182 is set appropriately in order to obtain the desired axial-direction characteristic of the resilient bush 18, which will be specifically described later. Therefore, according to this desired axial-direction characteristic of the resilient bush 18, there are cases where no washer is arranged, the washer 182 is arranged only one end, in the axial direction, of the inner cylinder 181, or the washers 182 are arranged at the both sides of that. Further, even in a case where the plural washers 182 are arranged at the both sides, the number of the washers 182 may be set to be equal or different.

Further, in the lower rod 19 comprising the above-described elements, the axial adjustment portion 192a is screwed to the screw adjustment portion 191b to a certain degree and then fixed by the fixation nut 193. Moreover, the screw groove formed at the inner surface of the outer cylindrical portion 192b and the screw projection formed at the outer peripheral surface of the outer-fit-into cylindrical portion 194 are screwed together, whereby the outer-cylinder axial portion 192 and the outer-fit-into cylindrical portion 194 are assembled. Thus, the lower rod 19 having the specified length is assembled.

Also, in the upper rod 17 comprising the above-described elements, the axial adjustment portion 172a is screwed to the screw adjustment portion 171b to a certain degree, whereby the body portion 171 and the adjusting rod 172 are connected, and then fixed by the fixation nut 173. Moreover, the axial portion 174b of the tip stopper 174 is inserted into the inner cylinder 181 assembled to the resilient bush 18 and the inner spaces of the washers 182 arranged at the both sides. Then, the axial portion 174b of the tip stopper 174 is screwed to the screw recess section 172d of the outer cylindrical portion 172b of the adjusting rod 172, whereby the tip stopper 174 is attached to the adjusting rod 172. Herein, the axial portion 174b is inserted into the inner cylinder 181 and the inner spaces of the washers 182. That is, the resilient bush 18 and the washers 182 which are assembled to the adjusting rod 172 by the tip stopper 174 are arranged between the flange part 172c of the adjusting rod 172 and the restriction disc portion 174a of the tip stopper 174.

Further, the resilient bush 18 and the washers 182 which are arranged between the flange part 172c of the adjusting rod 172 and the restriction disc portion 174a of the tip stopper 174 are restricted from the both sides, in the axial direction, by the flange part 172c and the restriction disc portion 174a by sufficiently screwing the axial portion 174b of the tip stopper 174 to the flange part 172c of the outer cylindrical portion 172b.

Since the washers 182 are arranged between the end portion of the inner cylinder 181 and the flange part 172c and between the restriction disc portion 174a and the end portion of the inner cylinder 181, the flange part 172c of the outer cylindrical portion 172b and the axial portion 174b of the tip stopper 174 are screwed to each other until the washer 182, the inner cylinder 181, and the washer 182 are clamped by the flange part 172c of the adjusting rod 172 and the restriction disc portion 174a of the tip stopper 174.

Thus, by fitting the outer-fit-into cylindrical portion 194 into the fit-into recess section 18a of the resilient bush 18 which is restricted from the both sides, in the axial direction, by the adjusting rod 172 and the tip stopper 174 which are screwed until the washer 182, the inner cylinder 181, and the washer 182 are clamped, the connecting rod 16 is assembled.

The front end portion of this connecting rod 16 is pivotally connected to the connecting-rod connection portion 126 of the upper arm 12 via the ball joint 126a, and its rear end portion is pivotally connected to the connecting-rod connection portion 139 of the lower arm 13 via the ball joint 139a. Thereby, the connecting rod 16 is provided to extend between the upper arm 12 and the lower arm 13 in the inclined state such that its front side is located at the higher level than its rear side. Further, the connecting rod 16 is rotatable in a reverse direction according to the vertical moves of the respective arms 12, 13. Thereby, the connecting rod 16 is provided to extend between the both arms 12, 13 without preventing the vertical moves of the arms 12, 13. Moreover, the connecting rod 16 is provided on the vehicle-body side of the arms 12, 13, not on the side of the knuckle 11 of the arms 12, 13.

<Major Effects>

The double-wishbone type of suspension device for the vehicle according to the present embodiment comprises the forked-shaped upper arm 12 comprises the front-side arm portion 123 and the rear-side arm portion 124, the forked-shaped lower arm 13 comprising the front-side arm portion 133 and the rear-side arm portion 134, and the connection rod 16 connecting the front-side arm portion 123 of the upper arm 12 and the rear-side arm portion 134 of the lower arm 13, wherein the connecting rod 16 comprises the upper rod 17 which is rotatably connected to the upper arm 12, the lower rod 19 which is rotatably connected to the lower arm 13, and the resilient bush 18 which connects the upper rod 17 and the lower rod 19 in the expandable manner in the axial direction.

According to the present suspension device, since the connecting rod 16 which is configured as described above is provided, the longitudinal-compliance securement and the caster-rigidity securement can be compatibly attained and the step-riding-over shock can be properly reduced, without deteriorating the performance of the suspension.

More specifically, since the connecting rod 16 is provided to extend between the upper arm 12 and the lower arm 13 and arranged in the inclined state in the vehicle longitudinal direction, the longitudinal moves, in the opposite direction, of the upper arm 12 and the lower arm 13 during braking can be suppressed, so that the caster rigidity can be secured properly.

Further, while the resilient bushes DB are generally provided between the respective vehicle-body connection portions of the upper arm 12 and the lower arm 13 and the vehicle body, the longitudinal compliance of the suspension by means of the resilient bushes DB can be secured properly.

Moreover, since the connecting rod 16 comprises the upper rod 17 which is rotatably connected to the upper arm 12, the lower rod 19 which is rotatably connected to the lower arm 13, and the resilient bush 18 which connects the upper rod 17 and the lower rod 19 in the expandable manner in the axial direction, the connecting rod 16 can connect the upper arm 12 and the lower arm 13 without deteriorating the respective vertical moves of the upper arm 12 and the lower arm 13 as the suspension performanc.

Additionally, since the resilient bush 18 connects the upper rod 17 rotatably connected to the upper arm 12 and the lower rod 19 rotatably connected to the lower arm 13 in the expandable manner in the axial direction, this resilient bush 18 absorbs the step-riding-over shock through its expansion/contraction in the axial direction, so that the step-riding-over shock can be reduced properly.

Further, the flange part 172c to restrict the upper end, in the axial direction, of the resilient bush 18 may be integrally formed at the upper rod 17. According to this structure, the number of parts or assembling steps can be reduced comparted to a case where this flange part 172c is formed separately from the upper rod 17.

Moreover, the restriction disc portion 174a to restrict the lower end, in the axial direction, of the resilient bush 18 may be configured to be mountable on the upper rod 17. According to this structure, the lower end, in the axial direction, of the resilient bush 18 can be restricted by mounting the restriction disc portion 174a on the upper rod 17. Moreover, the both sides, in the axial direction, of the resilient bush 18 is so restricted that the step-riding-over shock can be absorbed securely by this resilient bush 18.

Also, the washer 182 may be provided between the end portion, in the axial direction, of the resilient bush 18 and the flange part 172c. According to this structure, the characteristics, in the axial direction, of the resilient bush 18 which absorbs the step-riding-over shock can be adjusted.

Specifically, the restriction state of the resilient bush 18, the both side, in the axial direction, of which are restricted by the flange part 172c and the restriction disc portion 174a can be changed by providing the washers 18 between the end portion, in the axial direction, of the resilient bush 18 and the flange part 172c and the restriction disc portion 174a. Thus, the shock absorption performance of the resilient bush 18, i.e., the axial-direction characteristics of the resilient bush 18, can be changed by changing the restriction state of the resilient bush 18. That is, the axial-direction characteristics of the resilient bush 18 can be adjusted by adjusting existence/nonexistence or the number of the washers 182 which are provided between the end portion of the resilient bush 18 and the flange part 172c and the restriction disc portion 174a.

Further, the outer cylindrical portion 192b may be fit into the resilient bush 18 in a state where the outer cylindrical portion 192b is restricted in the axial direction, and the lower rod 19 may be mounted on the outer cylindrical portion 192b. According to this structure, the lower rod 19 can be, in the expandable manner, connected to the resilient bush 18 which is restricted, in the axial direction, by the flange part 172c of the upper rod 17 and the restriction disc portion 174a. Accordingly, the axial direction can be restricted by the flange part 172c of the upper rod 17 and the restriction disc portion 174a, and also the relative move, in the axial direction, of the both rods which may occur in the step-riding-over traveling can be absorbed by the expandable resilient bush 18 where the lower rod 19 is connected in the expandable manner. Thereby, the step-riding-over shock can be reduced properly.

A verification test of results of effects which has been conducted regarding the arrangement of the washers 182 of the connecting rod 16 in the suspension device 1 described above will be described referring to FIG. 8. In the present verification test, the axial-direction characteristics of the resilient bush 18 has been verified for a case (a test sample A) where the single washer 182 is arranged at each of the both sides of the internal cylinder 181 pressed into the resilient bush 18, another case (a test sample B) where no washer is arranged at each of the both sides of the internal cylinder, and further another case (a test sample C) where the two resilient bushes 18 are arrange arranged at each of the both sides of the internal cylinder 181, respectively.

In the connecting rod 16, by applying a load acting in an expansion/contraction direction of the upper rod 17 and the lower rod 19, the resilient bush 18 expands or contacts in the axial direction, thereby absorbing the above-described load. In the connecting rod 16 described above, the resilient bush 18 which is restricted from the both sides, in the axial direction, by the flange part 172c and the restriction disc portion 174a is configured to have the same length as the inner cylinder 181, and a clearance which corresponds to the thickens of the washer 182 is provided by arranging the washer 182 between the inner cylinder 181 and the flange part 172c or the restriction disc portion 174a.

Therefore, even if the load acting in the expansion/contraction direction of the upper rod 17 and the lower rod 19 is applied, the timing of expansion/contraction, in the axial direction, of the resilient bush 18 via the outer-fit-into cylinder portion 194 is deviated (shifted) by this clearance, so that deflection (i.e., displacement quantity) for the same load differs.

Figure 8:
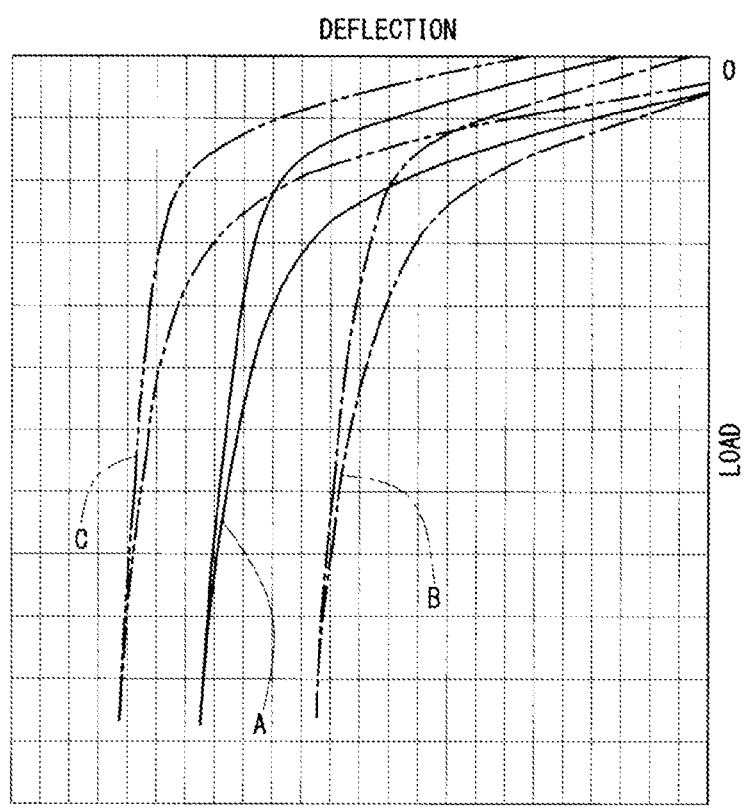
FIG. 8 is a graph of results of a verification test of a bush characteristic.

Referring to FIG. 8, comparing to the deflection (displacement quantity) of the connecting rod 16 (test sample A) where the single washer 182 is arranged at each of the both sides of the inner cylinder 181, the deflection (displacement quantity) of the connection rod 16 (test sample B) where no washer is arranged at all decreases and the deflection (displacement quantity) of the connection rod 16 (test sample C) where the two washers 182 are arranged at each of the both sides of the inner cylinder 181 increases.

As described above, it has been confirmed that the axial-direction characteristics of the resilient bush 18 change depending on existence or nonexistence of the washer 182 arranged at each of the both sides, in the axial direction, of the inner cylinder 181 or depending on the number of the washers 182 when being arranged.

<Modification 1>

Figure 9:
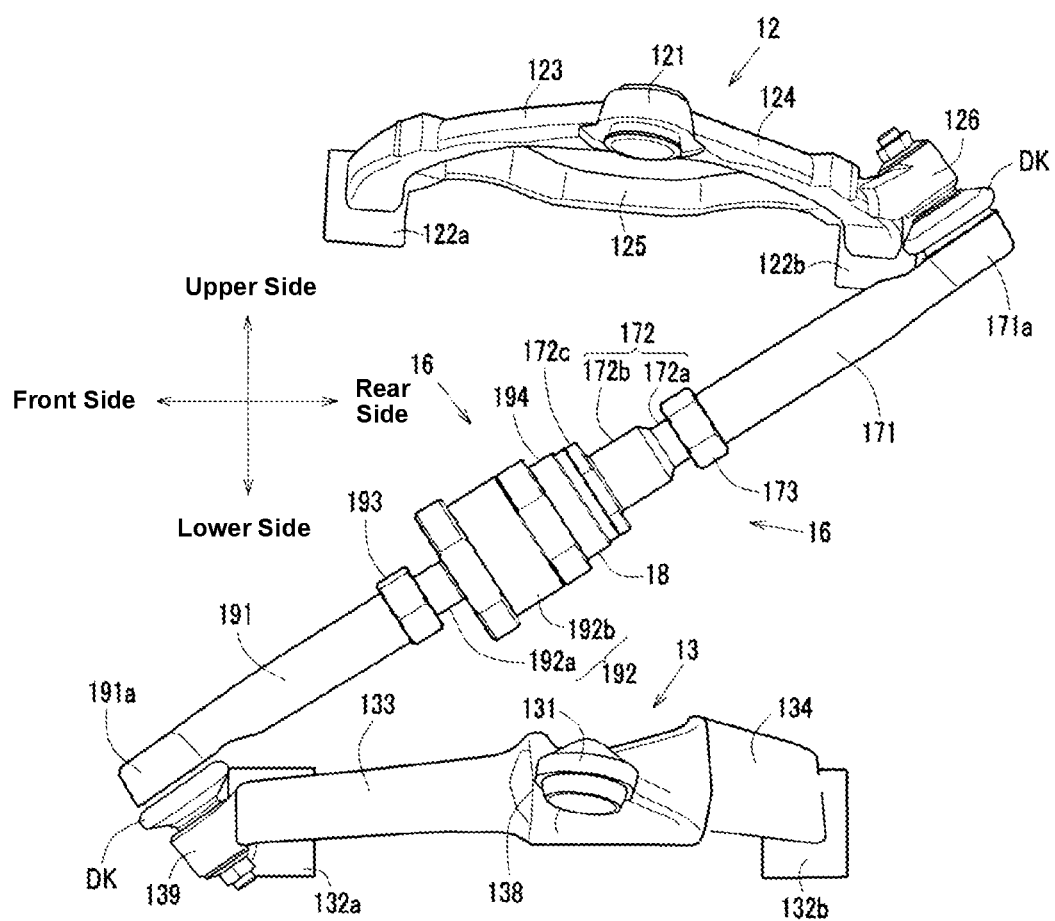
FIG. 9 is a side view showing a modification of an attachment position of the connecting rod.

While the connecting rod 16 of the above-described embodiment is provided to extend between the upper arm 12 and the lower arm 13 in the inclined state such that its front side is located at the higher level than its rear side, the inclined state of the connecting rod 16 may be configured such that its front side is located at a lower level than its rear side as shown in FIG. 9. In this case, the connecting-rod connection portion 126 positioned on the side of the upper arm 12 is provided in back of the rear side portion of the upper arm 12 (i.e., the rear-side arm portion 124). Further, the connecting-rod connection portion 139 positioned on the side of the lower arm 13 is provided in front of the front side portion of the lower arm 13 (i.e., the front-side arm portion 133). In this case, a compressive load acts on the connecting rod 16 during braking, so that the longitudinal moves, in the opposite direction, of the both arms 12, 13 are suppressed.

Herein, both of the connecting rod 16 positioned in the inclined state such that its front side is located at the higher level than its rear side and the connecting rod 16 positioned in the inclined state such that its front side is located at the lower level than its rear side may be provided to extend between the both arms 12, 13. In this case, these two connecting rods 16 are provided to be offset from each other in the vehicle width direction.

<Modification 2>

Figure 10:
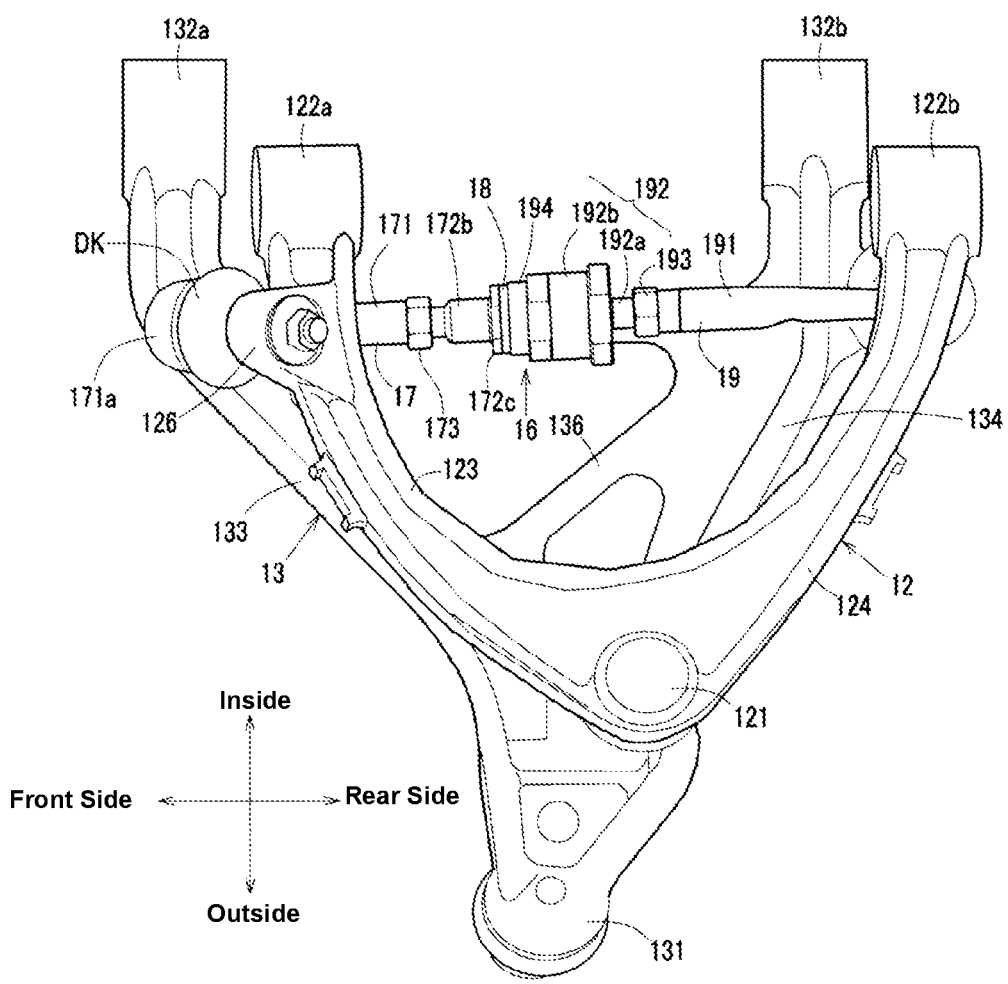
FIG. 10 is a plan view of the upper arm which is formed in a nearly V shape.
Figure 11:
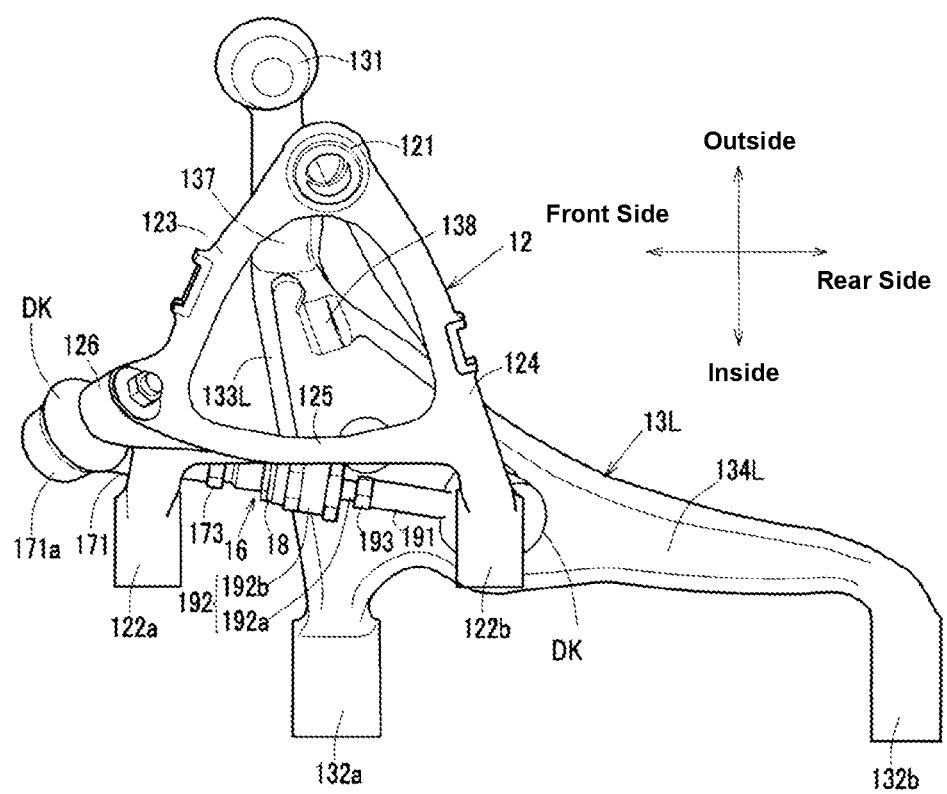
FIG. 11 is a plan view of the lower arm which is formed in a nearly L shape.

While the upper arm 12 is formed, in the nearly A shape, in the plan view of the above-described embodiment, the nearly V-shaped upper arm 12 may be applicable instead as shown in FIG. 10. The upper arm 12 of this case can be configured by omitting the connection arm portion 125 from the configuration of the upper arm 12 of the above-described embodiment.

<Modification 3>

While the lower arm 13 is formed in the nearly A shape, in the plan view, of the above-described embodiment, a nearly L-shaped lower arm 13L may be applicable instead. In this case, the lower arm 13L comprises the knuckle connection portion 131 which is connected to the lower portion of the knuckle 11, a pair of front-and-rear vehicle-body connection portions (the front-side vehicle-body connection portion 132a and the rear-side vehicle-body connection portion 132b) which are connected to the lower portion of the side face 3a of the vehicle-body front portion 3, a lateral arm portion 133L which connects the knuckle connection portion 131 and the front-side vehicle-body connection portion 132a, a longitudinal arm portion 134L which connects the lateral arm portion 133L and the rear-side vehicle-body connection portion 132b, the damper connection portion 137 where the forked lower end portion of the damper 14 is connected, the stabilizer connection portion 138 where the end portion of the stabilizer 15 is connected, and the connecting-rod connection portion 139 where the lower end portion of the connecting rod 16 is connected. Herein, the knuckle connection portion 131, the front-side vehicle-body connection portion 132a, and the rear-side vehicle-body connection portion 132b are configured like the above-described embodiment.

The lateral arm portion 133L extends in the vehicle width direction, and an outward end part, in the vehicle width direction, thereof is connected to the knuckle connection portion 131 and an inward end part, in the vehicle width direction, thereof is connected to the front-side vehicle-body connection portion 132a. The longitudinal arm portion 134L extends rearwardly from near an inside end portion, in the longitudinal direction, of the lateral arm portion 133L, and a rear end portion, in the longitudinal direction, of the longitudinal arm portion 134L is bent inwardly in the vehicle width direction and connected to the rear-side vehicle-body connection portion 132b. The width, in the vehicle width direction, of the longitudinal arm portion 134L becomes gradually narrower as it goes rearwardly.

The damper connection portion 137 is provided to rise on the inside of the knuckle connection portion 131 of the lateral arm portion 133L. The damper connection portion 137 has a penetration hole which penetrates the damper connection portion 137 substantially in the longitudinal direction. A fastening member (e.g., a bolt) is inserted into the penetration hole 141b of the lower end portion of the damper body 141 and thereby fixed to the penetration hole of the damper connection portion 137, whereby the lower end portion of the damper body 141 is connected to the damper connection portion 137 rotatably in the vehicle width direction.

The stabilizer connection portion 138 is provided to raise near a center, in the longitudinal direction, of the lateral arm portion 133L (e.g., closely to an inward side of the damper connection portion 137). The connecting-rod connection portion 139 is provided near a center, in the longitudinal direction, of the longitudinal direction, of the longitudinal arm portion 134L. The connecting-rod connection portion 139 is formed as a base portion which is inclined rearwardly. An upper end face of the connecting-rod connection portion 139 is inclined obliquely rearwardly-and-downwardly, and a ball joint (not illustrated) where the lower end portion of the connecting rod 16 is connected is provided at the above-described upper end face nearly vertically.

Since the upper end face of the connecting-rod connection portion 139 is inclined, the above-described upper end face is substantially in parallel to the connecting rod 16, so that a situation where a connection angle of the connecting rod 16 relative to the connecting-rod connection portion 139 becomes an inappropriate angle when the rear end portion of the connecting rod 16 is connected to the connecting-rod connection portion 139 can be avoided.

In this modification 3, the upper arm 12 is formed in the nearly A shape in the plan view like the above-described embodiment. Further, in a state where the upper arm 12 and the lower arm 13L are connected to the side face 3a of the vehicle-body front portion 3, the upper arm 12 is provided to be slightly forwardly offset from the lower arm 13L. Accordingly, even if the connecting rod 16 is provided to extend between a position located in front of the front side portion of the upper arm 12 and a central position, in the longitudinal direction, of the lower arm 13L, the connecting rod 16 can be substantially inclined in the vehicle longitudinal direction.

While the lower arm 13L of the modification 3 is used such that the lateral arm portion 133L is positioned on the vehicle forward side, the lateral arm portion 133L may be used such that the lateral arm portion 133L is positioned on the vehicle rearward side. Further, while the lower arm 13L of the modification 3 is formed in the nearly L shape in the plan view, the upper arm 12 may be formed in the nearly L shape in the plan view or both of the arms 12, 13L may be formed in the nearly L shape in the plan view.

In correspondence between the present invention and the above-described embodiment (including the above-described modifications), the front-side arm portion of the invention corresponds to the front-side arm portions 123, 133, 133L of the embodiment (modifications). Likewise, the rear-side arm portion corresponds to the rear-side arm portions 124, 134, 134L, the upper arm corresponds to the upper arm 12, the lower arm corresponds to the lower arms 13, 13L, the suspension device for the vehicle corresponds to the suspension device for the vehicle 1, the rod member corresponds to the connecting rod 16, the upper rod corresponds to the upper rod 17, the lower rod corresponds to the lower rod 19, the bush corresponds to the resilient bush 18, the stopper corresponds to the flange part 172c, the other-side stopper corresponds to the restriction disc portion 174a, the washer corresponds to the washer 182, the outer cylinder corresponds to the outer cylindrical portion 192b, and the other rod corresponds to the upper rod 17. However, the present invention should not limited to the above-described embodiment (modifications) and any other improvements are applicable.

What is claimed is:

1. A double-wishbone type of suspension device for a vehicle, comprising:
   a forked-shaped upper arm comprising a front-side arm portion and a rear-side arm portion;
   a forked-shaped lower arm comprising a front-side arm portion and a rear-side arm portion; and
   a rod member connecting the front-side arm portion of one of the upper arm and the lower arm and the rear-side arm portion of the other of the upper arm and the lower arm,
   wherein said rod member comprises an upper rod which is rotatably connected to said upper arm, a lower rod which is rotatably connected to said lower arm, and a bush which connects said upper rod and said lower rod in an expandable manner in an axial direction, wherein
   a stopper to restrict one side, in the axial direction, of said bush is integrally formed at one of said upper rod and said lower rod.

2. The suspension device for the vehicle of claim 1, wherein an other-side stopper to restrict the other side, in the axial direction, of said bush is configured to be mountable on said one of the upper rod and the lower rod.

3. The suspension device for the vehicle of claim 2, wherein a washer is provided between an end portion, in the axial direction, of the bush and said stopper.

4. The suspension device for the vehicle of claim 3, wherein an outer cylinder is fit into said bush in a state where the outer cylinder is restricted in the axial direction, and the other of said upper rod and said lower rod is mounted on said outer cylinder.

5. The suspension device for the vehicle of claim 1, wherein a washer is provided between an end portion, in the axial direction, of the bush and said stopper.

6. The suspension device for the vehicle of claim 1, wherein an outer cylinder is fit into said bush in a state where the outer cylinder is restricted in the axial direction, and the other of said upper rod and said lower rod is mounted on said outer cylinder.

7. The suspension device for the vehicle of claim 2, wherein an outer cylinder is fit into said bush in a state where the outer cylinder is restricted in the axial direction, and the other of said upper rod and said lower rod is mounted on said outer cylinder.

8. The suspension device for the vehicle of claim 5, wherein an outer cylinder is fit into said bush in a state where the outer cylinder is restricted in the axial direction, and the other of said upper rod and said lower rod is mounted on said outer cylinder.

9. The suspension device for the vehicle of claim 1, wherein said upper arm comprises a pair of front-and-rear vehicle-body connection portions which are connected to an upper portion of a side face of a vehicle-body front portion and a connecting-rod connection portion where an upper end portion of a connecting rod as said rod member is connected, said vehicle-body connection portions are respectively formed in a cylindrical shape, respective cylinder axial lines of which are provided coaxially to extend in a vehicle longitudinal direction, a cylindrical-shaped resilient bush is fit into each cylinder of said vehicle-body connection portions, a pair of front-and-rear support brackets which rotatably support said respective vehicle-body connection portions vertically are provided at the upper portion of the side face of the vehicle-body front portion, said support brackets support both end parts of respective rotational axis portions of said vehicle-body connection portions which extend in the vehicle longitudinal direction, and said respective rotational axis portions are rotatably inserted into respective central holes of said resilient bushes inside the vehicle-body connection portions.

10. The suspension device for the vehicle of claim 1, wherein said lower arm comprises a pair of front-and-rear vehicle-body connection portions which are connected to a lower portion of a side face of a vehicle-body front portion and a connecting-rod connection portion where a lower end portion of a connecting rod as said rod member is connected, said vehicle-body connection portions are respectively formed in a cylindrical shape, respective cylinder axial lines of which are provided coaxially to extend in a vehicle longitudinal direction, a cylindrical-shaped resilient bush is fit into each cylinder of said vehicle-body connection portions, a pair of front-and-rear support brackets which rotatably support said respective vehicle-body connection portions vertically are provided at the lower portion of the side face of the vehicle-body front portion, said support brackets support both end parts of respective rotational axis portions of said vehicle-body connection portions which extend in the vehicle longitudinal direction, and said respective rotational axis portions are rotatably inserted into respective central holes of said resilient bushes inside the vehicle-body connection portions.

11. The suspension device for the vehicle of claim 9, wherein said lower arm comprises a pair of front-and-rear vehicle-body connection portions which are connected to a lower portion of the side face of the vehicle-body front portion and a connecting-rod connection portion where a lower end portion of said connecting rod as said rod member is connected, said vehicle-body connection portions are respectively formed in a cylindrical shape, respective cylinder axial lines of which are provided coaxially to extend in the vehicle longitudinal direction, a cylindrical-shaped resilient bush is fit into each cylinder of said vehicle-body connection portions, a pair of front-and-rear support brackets which rotatably support said respective vehicle-body connection portions vertically are provided at the lower portion of the side face of the vehicle-body front portion, said support brackets support both end parts of respective rotational axis portions of said vehicle-body connection portions which extend in the vehicle longitudinal direction, and said respective rotational axis portions are rotatably inserted into respective central holes of said resilient bushes inside the vehicle-body connection portions.

\* \* \* \* \*